US009689378B2

(12) United States Patent
Thomsen

(10) Patent No.: US 9,689,378 B2
(45) Date of Patent: Jun. 27, 2017

(54) DEVICE AND METHOD FOR TRANSPORTING AND STORING A WIND TURBINE BLADE

(71) Applicant: Vestas Wind Systems A/S, Aarhus N. (DK)

(72) Inventor: Peter Frans Thomsen, Ringkobing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 14/912,229

(22) PCT Filed: Aug. 12, 2014

(86) PCT No.: PCT/DK2014/050241
§ 371 (c)(1),
(2) Date: Feb. 16, 2016

(87) PCT Pub. No.: WO2015/021989
PCT Pub. Date: Feb. 19, 2015

(65) Prior Publication Data
US 2016/0201644 A1    Jul. 14, 2016

(30) Foreign Application Priority Data

Aug. 15, 2013 (DK) .................................. 2013 70445

(51) Int. Cl.
*B60P 7/08* (2006.01)
*F03D 13/40* (2016.01)
(Continued)

(52) U.S. Cl.
CPC ................ *F03D 13/40* (2016.05); *B60P 3/40* (2013.01); *B60P 7/12* (2013.01); *F03D 13/10* (2016.05);
(Continued)

(58) Field of Classification Search
CPC .... B60P 3/40; B60P 7/12; F03D 1/001; F03D 1/005; F05B 2230/61
(Continued)

(56) References Cited

U.S. PATENT DOCUMENTS

2010/0310379 A1   12/2010 Livingston
2012/0114443 A1   5/2012 Cyrus et al.
(Continued)

FOREIGN PATENT DOCUMENTS

DE    102009017068 A1   10/2010
JP    2010216317 A      9/2010
WO    2010034732 A1     4/2010

OTHER PUBLICATIONS

European Patent Office, International Search Report and Written Opinion issued in International Application No. PCT/DK2014/050241 dated Oct. 24, 2014.
(Continued)

*Primary Examiner* — Stephen Gordon
(74) *Attorney, Agent, or Firm* — Wood Herron & Evans LLP

(57) ABSTRACT

The invention proposes a device (1000) and a method for storing and transporting a wind turbine blade (100). The blade (100) is inserted between an upper structure (220) and a lower structure (240) applying a clamping force on the blade surface. The magnitude of the clamping force can be adjusted by way of a device (400) comprising an elastic member (440) arranged between the upper structure (220) and the lower structure (240) during operation. The magnitude of the elastic force exerted by the elastic element (420) is proportional to the magnitude of the clamping force. Furthermore, the magnitude of the elastic force linearly depends on the amount of compression of the elastic element (440) with respect to a characteristic rest length.

18 Claims, 4 Drawing Sheets

(51) Int. Cl.
*B60P 3/40* (2006.01)
*B60P 7/12* (2006.01)
*F03D 13/10* (2016.01)

(52) U.S. Cl.
CPC ......... *F05B 2230/61* (2013.01); *Y02E 10/721* (2013.01); *Y02E 10/728* (2013.01); *Y02P 70/523* (2015.11)

(58) Field of Classification Search
USPC ............. 410/32, 34, 35, 36, 44, 45, 53, 155; 280/404
See application file for complete search history.

(56) References Cited

U.S. PATENT DOCUMENTS

| | | | |
|---|---|---|---|
| 2013/0142585 A1* | 6/2013 | Yogodzinski | B60P 3/40 410/44 |
| 2014/0050547 A1* | 2/2014 | Hiremath | B60P 7/12 410/44 |

OTHER PUBLICATIONS

Danish Patent and Trademark Office, Search Report issued in Application No. PA 2013 70445 dated Mar. 17, 2014.
European Patent Office, Office Action in EP14753199.0, Feb. 3, 2017.

\* cited by examiner

DEVICE AND METHOD FOR TRANSPORTING AND STORING A WIND TURBINE BLADE

FIELD OF THE INVENTION

The present invention relates to the field of blades for large wind turbines. In particular, the present invention provides a system and a method for safely and conveniently storing and transporting wind turbine blades of huge dimensions.

BACKGROUND AND STATE OF THE ART

In recent years, there has been an increased focus on reducing emissions of greenhouse gases generated by burning fossil fuels. One solution for reducing greenhouse gas emissions is developing renewable sources of energy. Particularly, energy derived from the wind has proven to be an environmentally safe and reliable source of energy, which can reduce dependence on fossil fuels.

Energy in wind can be captured by a wind turbine, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The rotor is provided with one or more blades, which can be set into rotation about the shaft by the force exerted by the wind.

In order to increase the amount of wind power intercepted by a wind turbine, the trend in modern wind turbine design is to increase the length of the blades. For example, blades used in modern installations may be up to 80 m long and have a diameter of 5 m and more at the root side.

Given these considerable dimensions, transportation of turbine blades from the production site to the installation site may in some cases be problematic. For long blades, transportation is usually carried out by using vehicles such as that shown in FIG. 1. Vehicle 1 comprises a front tractive unit 3 and a rear non-tractive unit 5. The blade 2 is suspended between the front transportation unit 3 and the rear transportation unit 5 and secured thereto. When the blade 2 is not present in vehicle 1, the rear non-tractive unit 5 is not directly connected to the front tractive unit 3. Rather, the tractive force is transferred from the front tractive unit 3 to the rear non-tractive 5 unit through the blade 2.

Usually, a clamping system is used in order to fasten the tip of the blade 2 to non-tractive unit 5 of vehicle 1. In this case, it is crucial that the clamping force is known and can be adjusted to a desired value. In particular, the clamping force must be high enough for blade 2 to be able to pull rear non-tractive unit 5 without sliding out of the clamp when tractive unit 3 is in motion. On the other hand, the magnitude of the clamping force cannot be increased at will, since too high a clamping force would cause damage or break of the blade surface.

European patent number 2 105 349 B1 describes an example of a transportation unit which can be used as a rear non-tractive unit in the vehicle shown in FIG. 1. With reference to FIG. 2, non-tractive unit 5 comprises a carrier arrangement 26 secured on a rotatable part 25 on a platform 28. The rear end of a wind turbine blade 2 may be fixed to a plurality of fixing frames 27. The blade 2 is secured to a fixing frame 27 by fixing a top horizontal rod 29 to a pair of vertical rods 30 laterally delimiting fixing frame 27. However, in the non-tractive unit described by EP 2 105 349 B1, the clamping force exerted on the blade can neither be precisely known, nor be adjusted to a predetermined value.

Although extremely important, adjusting the clamping force to a predetermined value is particularly challenging. Due to manufacturing tolerances on both the clamps and the blades, the position of the clamp jaws must be adjusted from blade to blade, in order to ensure that the clamping force meets the required value.

Furthermore, a reliable device for enabling clamping force adjustment can neither rely on, nor involve any frictional forces. For example, one might consider using a screw or a bolt which could be tightened with respect to a cooperating nut by applying a predetermined moment. However, the clamping force would in that case depend on the friction between the thread on the bolt and the cooperating thread on the nut. This friction can dramatically vary depending on many factors. For example, if the screw or bolt is new and duly greased, the friction is in general different from that of the same system after a certain amount of time. Moreover, given a fixed time interval, for example one year, the friction will in general vary in different manners depending on external factors such as the environmental conditions where the clamp is. Thus, if the clamp has been mainly stored in an indoor facility, the variation of friction between the nut and the bolt is different from the case in which the nut has been mainly kept outdoors during the time interval considered. In all cases, this unpredictable change of friction between the bolt and the nut will be directly transferred to the clamping force, which therefore cannot be set to a known, desired magnitude.

For analogous reasons, it is not recommended to use one or a stack of Belleville spring washers in the clamp in order to directly or indirectly apply an elastic force to the blade. Belleville spring washers are known to display a hysteresis cycle in their load vs. deflection characteristic curve mainly caused by the friction between the spring washer and the loading surfaces. This hysteresis effect is enhanced when more Belleville spring washers are stacked in parallel. Thus, given a load applied to a single Belleville spring washer or a system thereof, the deflection cannot in general be determined in advance without knowing the previous history of the system. Symmetrically, given a predetermined value of deflection of each Belleville spring washer in a stack, the elastic force cannot be univocally determined.

Furthermore, the friction between adjacent spring washers or of the spring washer with the loading surfaces may vary over time. This is especially the case if spring washers are used in clamps which are mainly stored outdoors.

Thus, if Belleville spring washers are used in clamping systems for wind turbine blades, they must be frequently replaced so that the required clamping force can be achieved for all blades. This solution is clearly unsatisfactory due to the high costs required and limited possibilities of controlling the clamping force, especially over time.

In view of the problems and drawbacks noted above, a need exists for an improved clamping system adapted to be used when storing and transporting a wind turbine blade, particularly a blade of huge dimensions. More specifically, a need exists in the state of the art for a clamping system for a wind turbine blade, wherein the magnitude of the clamping force can be reliably and precisely known. Furthermore, one more need in the field of wind turbine blade manufacturing is that for a clamping system for a wind turbine blade, wherein the magnitude of the clamping force may be adjusted at will.

BRIEF DESCRIPTION OF THE INVENTION

The present invention is based on the inventive idea that clamping systems known from the prior art may be improved by introducing an elastic member, such as for example a coil spring, adapted to exert a clamping force on a wind turbine blade. The claimed clamping system is particularly adapted to be used for clamping a wind turbine blade of a non-tractive unit of a vehicle for blade transportation. The vehicle is comprised of a tractive unit connected by means of the blade to the non-tractive unit wherein the claimed clamp is mounted.

Based on this concept, the clamping device for storing and transporting a wind turbine blade is provided. The device comprises a first structure and a second structure adapted to abut onto opposite sides of the wind turbine blade. The device also comprises a clamping force adjustment device permitting adjustment of the magnitude of the clamping force exerted by the first structure and the second structure onto the wind turbine blade. The clamping force adjustment device comprises an elastic member arranged between the first structure and the second structure so as to apply to the first structure and the second structure an elastic force with a magnitude having a predetermined and univocal dependency on the amount of deflection of the elastic member with respect to a characteristic rest length. The magnitude of the clamping force is then proportional to the magnitude of the elastic force. The clamping force adjustment device further comprises a biasing mechanism adapted to deflect the elastic member, so as to permit adjustment of the magnitude of the elastic force.

The present invention also provides the method of clamping a wind turbine blade.

Further preferred embodiments of the present invention are provided by the dependent claims and by the following description.

DETAILED DESCRIPTION

In the following, the present invention will be clarified and explained by means of a detailed description of the embodiments of the present invention shown in the attached figures. However, it should be appreciated that the present invention is not limited to the embodiments shown in the attached drawings and described in the following.

Figure 3:
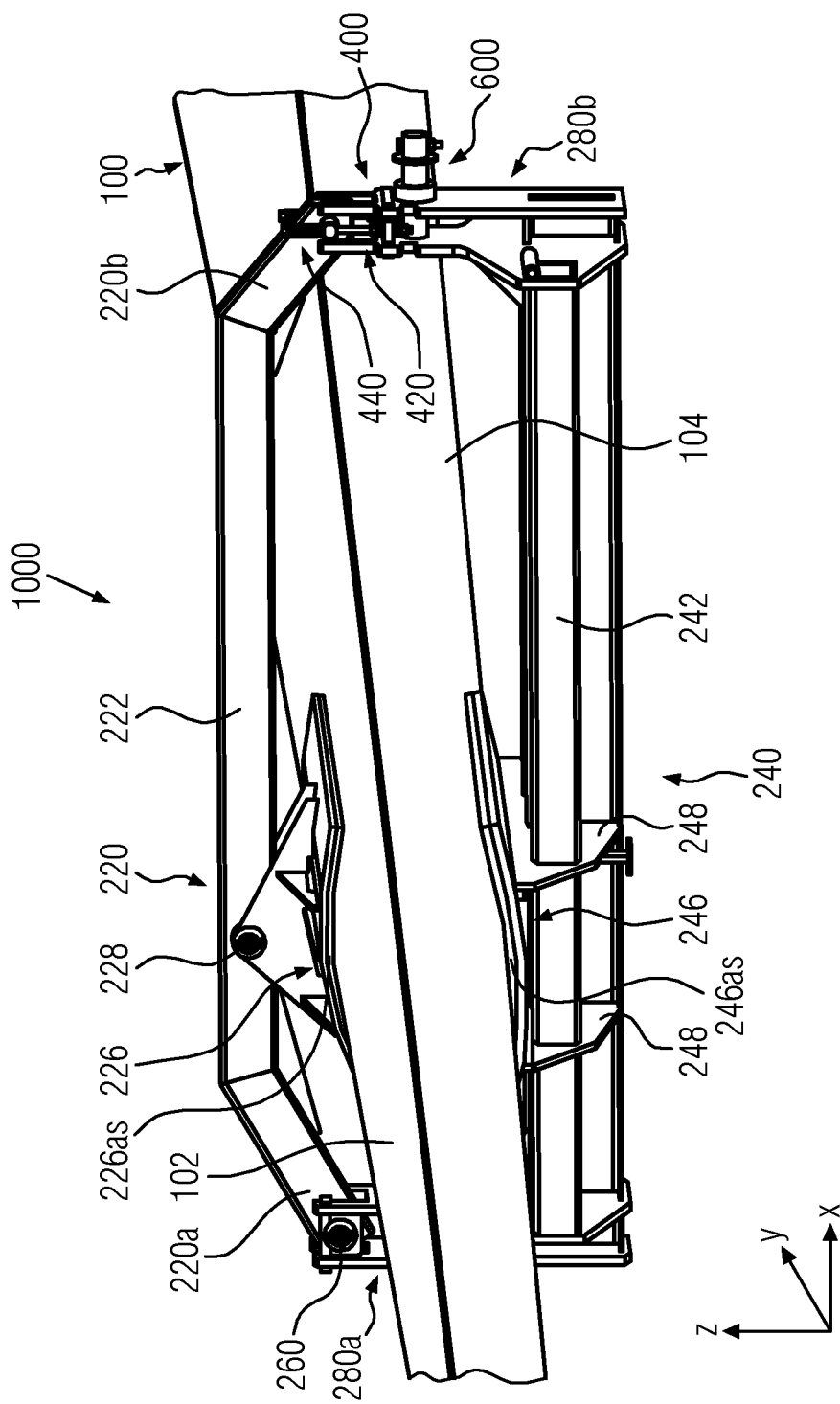
FIG. 3 shows a perspective view of a clamping system according to an embodiment of the preset invention.
Figure 4:
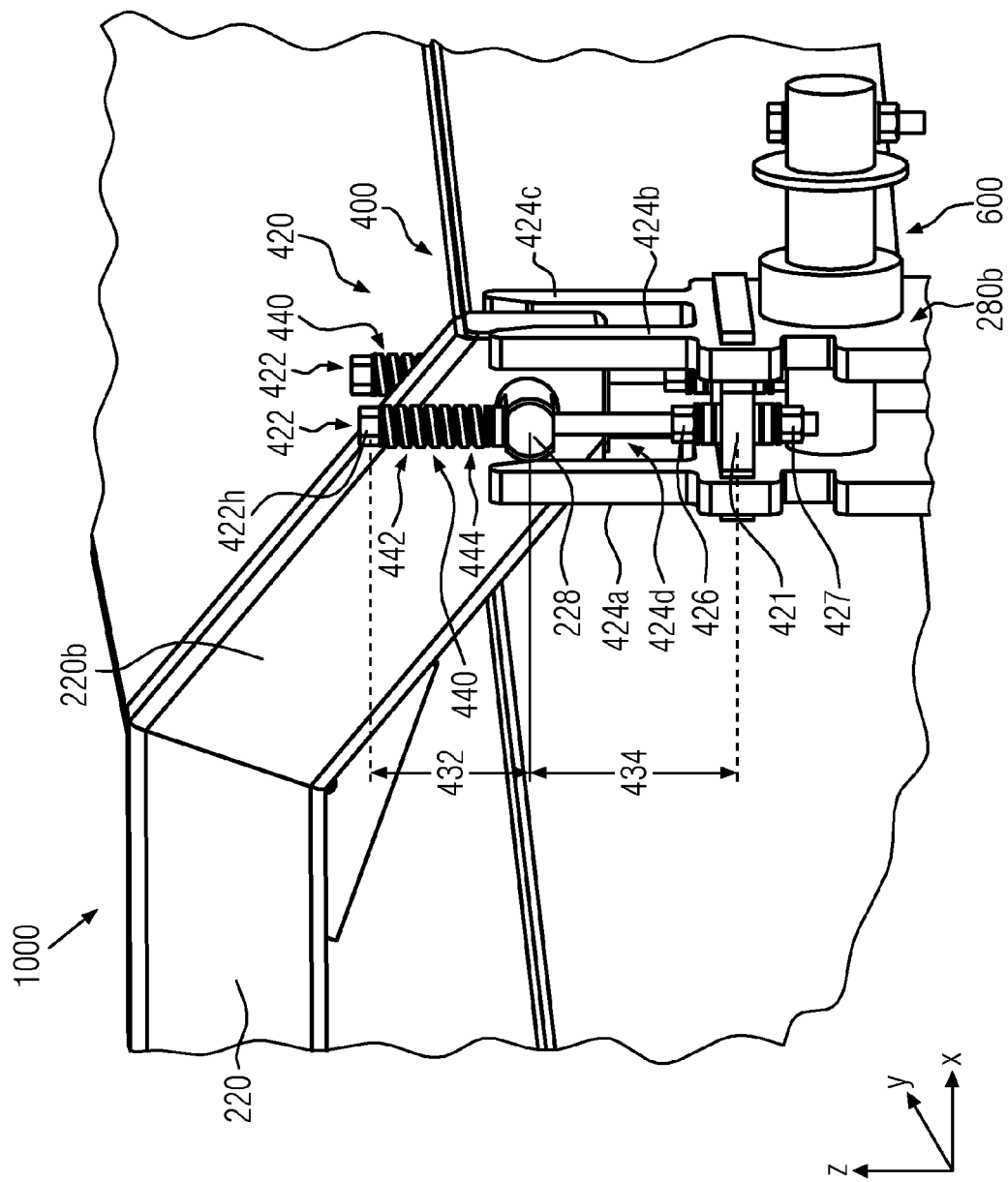
FIG. 4 shows an enlarged view of a portion of a clamping system according to an embodiment of the preset invention.

It should be understood that local relative positional or directional expressions will always be referred to a set of Cartesian axes indicated in FIGS. 3 and 4. The vertical direction is indicated by the oriented z-axis, whereas axes x and y define a reference horizontal plane, normal to vertical z-axis. Thus, a plane or a direction will be termed "vertical" and "horizontal" when the plane or directions are parallel to vertical z-axis and to horizontal xy-plane, respectively. Furthermore, terms such as "above" or "below" will always be referred to the positive direction of vertical z-axis. Thus, a point A is "above" or "on" ("below" or "under") point B if the orthogonal projection of point A on the vertical z-axis is greater (less) than the orthogonal projection of point B on the z-axis.

FIG. 3 shows a perspective view of a clamping system 1000 for a wind turbine blade 100 according to an embodiment of the present invention.

Clamping system, or simply clamp 1000 comprises an upper structure 220 and a lower structure 240, whose relative position with respect to each other can be adjusted. When a wind turbine blade 100 is inserted into clamping system 1000, upper structure 220 and lower structure 240 are adapted to abut onto opposite surfaces 102 and 104 of blade 100, thereby applying to blade 100 a clamping force. The upper component of the clamping force, applied by upper structure 220 to upper surface of 102 of blade 100, is directed along the direction of the vertical z-axis. On the other hand, the lower component of the clamping force, applied by lower structure 240 to lower surface of 104 of blade 100, is directed along the direction opposite that of the vertical z-axis.

Lower structure 240 comprises a lower arm 242 having a longitudinal axis which, in FIG. 3, is substantially parallel to the horizontal x-axis. Lower arm 242 is laterally delimited by a first strut 280a and a second strut 280b firmly fixed to a first and a second end portion of lower structure 240, respectively. First strut 280a and second strut 280b may also be formed as integral parts of lower arm 242. According to the embodiment shown in FIG. 3, first strut 280a and second strut 280b have mutually parallel longitudinal axes, whose direction is parallel to the vertical z-axis. However, in other embodiments, first strut 280a and second strut 280b have longitudinal axes lying along non-vertical directions. The longitudinal axes of first strut 280a and second strut 280b may not be parallel to each other.

Upper structure 220 comprises an upper arm 222 having a longitudinal axis substantially parallel to lower arm 242 of lower structure 240. Upper arm 222 is laterally delimited by a first end portion 220a and a second end portion 220b of upper structure 220, attached to a first and a second end of upper arm 222, respectively.

Lower structure 240 comprises a lower contact element 246 connected to lower arm 242. Lower contact element 246 comprises a lower abutting surface 246as adapted to abut onto lower surface 104 of blade 100. Analogously, upper structure 220 comprises an upper contact element 226 connected to upper arm 222. Preferably, upper contact element 226 is rotatably connected to upper arm 222, so as to be able to rotate about a pivot 228. Upper contact element 226 comprises an upper abutting surface 226as adapted to abut onto upper surface 102 of blade 100.

Preferably, lower abutting surface 246as and upper abutting surface 226as have profiles matching the surface profile of lower surface 104 and upper surface 102 of blade 100, respectively. This can render the clamping force more effective. Advantageously, abutting surfaces 226as and 246as may comprise a non-scratch, non-slide material, so as to maximize the friction between the abutting surfaces of clamp 1000 and the surfaces of blade 100, without scratching or damaging the blade surface. Thus, abutting surfaces 226as and 246as may comprise soft materials such as, for example, a polymer or a polymer mixture. Example of materials which can be used as abutting surfaces 226as and 246as include: silicone, nylon, Teflon, and the like.

According to an embodiment, lower contact element 246 is connected to lower arm 242 so that its position along arm 242 can be adjusted. For example, lower contact element 246 may comprise guiding elements 248 constrained to slide along lower arm 242. Sliding of guiding elements 248 may be alternatively allowed when adjusting the position of lower contact element 246, and blocked when the position of lower contact element 246 is to remain constant with respect to lower arm 242. Preferably, lower contact element 246 is blocked with respect to lower arm 242 when clamping system 1000 is used for transporting a blade 100. Due to the position-adjustment option of lower contact element 246, clamping system 1000 may be adapted in order to store or transport blades 100 of different shapes. In particular, irrespective of the blade size and dimensions, the best position of lower contact element 246 can be chosen, in order to ensure that both upper abutting surface 226as and lower abutting surface 246as adhere as firmly as possible to the blade surface.

First end portion 220a of upper structure 220 is connected to first strut 280a in connection point 260. For example, first end portion 220a can be removably fixed to first strut 280a by using a clip or any other releasable fastening mechanism. Preferably, second end portion 220a is connected to first strut 280a so that upper structure 220 is free to rotate. Preferably, the axis of rotation of upper structure 220 is parallel to the horizontal y-axis. Thus, according to this embodiment, connection point 260 comprises a pivot or a hinge.

In general, the position of second end portion 220b of upper structure 220 with respect to lower structure 240 can be varied. More specifically, second end portion 220b of upper structure 220 can alternatively be connected to and disconnected from lower structure 240. Second end portion 220b can be connected to second strut 280b through a clamping force adjustment device 400. Device 400 is adapted to apply to upper structure 220 and to lower structure 240 a force directed toward lower structure 240 and upper structure 220, respectively.

Clamping force adjustment device 400 is attached to second strut 280b and, thus, to lower structure 240. Preferably, device 400 is removably attached to second strut 280b, so that device 400 or a portion thereof can alternatively be fixed to and detached from second strut 280b. In order to permit attachment and detachment of device 400, a releasable fastening mechanism 600 can be used.

Thus, in the embodiment shown in FIG. 3, first end portion 220a of upper structure 220 is rotatably attached to lower structure 240, whereas the relative position of second end portion 220b of upper structure 220 can be varied with respect to lower structure 240. However, in other embodiments the roles of first and second end portions 220a and 220b of upper structure 220 can be swapped. Thus, according to further embodiments not shown in the figures, second end portion 220b of upper structure 220 can be removably or rotatably attached to lower arm 240, for example by means of a hinge 260. According to these embodiments, first end portion 220a of upper structure 220 is such that its position with respect to lower structure 240 can be adjusted.

Clamping system 1000 can switch between an open position and a closed position.

Clamping system 1000 is open when a blade 100 is to be inserted therein or removed therefrom. In the open position, the gap between upper abutting surface 226as and lower abutting surface 246as is wide enough that blade 100 can be inserted in the gap or extracted therefrom. When clamping system 1000 is open, at least one of first end portion 220a and second end portion 220b of upper structure 220 is disconnected from lower structure 240, so as to allow the gap between upper and lower structure 220 and 240 to be widened. In the embodiment shown in FIG. 3, in the open position second end portion 220b is disconnected from lower structure 240, whereas first end portion 220b is connected to lower structure 240 through hinge 260. Second end portion may be disconnected from lower structure 240 by detaching device 400 or a portion thereof from second strut 280b.

Conversely, clamping system 1000 is closed after a wind turbine blade 100 has been inserted therein and when it is used for storing or transporting blade 100. In the closed position, both first end portion 220a and second end portion 220b of upper structure 220 are connected to lower structure 240. Second end portion 220b may be connected to lower structure 240 by attaching clamping force adjustment device 400 to second strut 280b.

Clamping system 1000 in its closed position is shown in FIG. 3. Upper abutting surface 226as and lower abutting surface 246as abut onto the upper surface 102 and the lower surface 104 of blade 100, respectively. During operation, clamping force adjustment device 400 is positioned so as to connect upper structure 220 and lower structure 240. Device 400 then applies an adjustable force pushing upper structure 220 and lower structure 240 towards each other. Since upper structure 220 and lower structure 240 are both rigid bodies, the force applied by device 400 is transferred to upper abutment surface 226as and lower abutment surface 246as, thereby resulting in a contact force applied to the blade surface. This contact force is the clamping force applied by clamping system 1000 to blade 100.

The system comprised of clamping system 1000 and blade 100 inserted therein operates as a second-class lever. The effort in the lever is applied by clamping force adjustment device 400. The resistance is then produced by the contact force applied by the surfaces of blade 100 onto upper abutting surface 226as and lower abutting surface 246as. Finally, the fulcrum lies in point 260, through which upper structure 220 is connected to first strut 280a. The ratio of the magnitude of the force applied by device 400 to the magnitude of the clamping force is a constant univocally determined by the structural characteristics of clamping system 1000. For example, crucial parameters of clamping system 1000 are the distance of upper and lower abutment surfaces 226as and 246as from connection point 260 and the distance of device 400 from connection point 260.

Clamping force adjustment device 400 will be described in more detail in the following with reference to FIG. 4, which shows a zoomed-in view of the clamping system 1000 shown in FIG. 3. As shown in FIG. 4, clamping force adjustment device 400 comprises a biasing mechanism 420 and an elastic member 440.

Biasing mechanism 420 is adapted to deflect elastic member 440 up to a predetermined length of elastic member 440. Biasing mechanism 420 comprises one or more than one fastening members 422. According to the embodiment shown in FIG. 4, biasing mechanism 420 comprises two fastening members 422 arranged in symmetric positions with respect to a vertical plane including the longitudinal axis of arm 222 of upper structure 220. According to other embodiments not shown, biasing mechanism 420 may comprise only one fastening member 422 or a number of fastening members 422 greater than two. Although the discussion will be made in the following in relation to one fastening member, it should be understood that the same discussion can also be applied, mutatis mutandis, to the other fastening members possibly present in the device.

Fastening member 422 comprises an upper head 422h attached to a lower elongated portion whose longitudinal axis is parallel to the vertical z-axis in FIG. 4.

When clamping system 1000 is closed, the elongated portion of fastening member 422 is attached to a bracket 421. The relative position of fastening member 422 can be adjusted with respect to bracket 421. In particular the distance of head 422*h* of fastening member 422 with respect to bracket 421 can be adjusted.

According to an embodiment, bracket 421 can be alternatively attached to second strut 280*b* when clamp 1000 is closed and detached from second strut 280*b* when clamp 1000 is open. Attachment and detachment of bracket 421 and, thus, of device 400, can be achieved by using fastening device 600. Alternatively, bracket 421 can be formed as an integral part of second strut 280*b*. Thus, fastening member 422 can be attached to lower structure 240 through bracket 421 and second strut 280*b*.

According to alternative embodiments, bracket 421 may be removably or permanently fixed to upper structure 220, so that fastening member 422 can be attached to upper structure 220 through bracket 421. According to this embodiment, the upper end 442 of elastic member abuts onto a surface of second structure 240 and lower end 444 abuts onto head 422*h* of fastening member 422.

Clamping force adjustment device 400 may also comprise a plurality of studs 424*a*-424*d* extending from the upper surface of bracket 421. Studs 424*a*-424*d* can be advantageously used, for example, as a guide in order to drive second end portion 220*b* of upper arm 220 in the correct position with respect to clamping force adjustment device 400.

As shown in FIG. 4, at least one of fastening members 422 can comprise a lower portion housed in a through-hole formed in bracket 421. Each through-hole of bracket 421 may house at most one portion of a unique fastening member 422 associated with that through hole.

According to an embodiment, fastening member 422 comprises a thread adapted to engage with a matching thread of an element attached to bracket 421. Fastening member 422 may thus comprise a threaded element such as a screw or a bolt. As shown in FIG. 4, a pair of nuts 426 and 427 may be used for cooperating with one fastening member 422. Nuts 426 and 427 abut onto opposite surfaces of bracket 421. When clamping system 1000 is closed, fastening member 422 is threadedly engaged with nuts 426 and 427. In this manner, a force directed along the positive or negative direction of vertical z-axis applied to fastening member 422 is readily transferred to bracket 421 through nuts 426 and 427.

According to other embodiments, only one of the two nuts 426 and 427, for example lower nut 427, could be present. In further embodiments, the thread on fastening member 422 could cooperate with a matching thread on the surface of the through hole hosting a portion of fastening member 422. In this case, the presence of nuts 426 and 427 would not be necessary.

If fastening member 422 is threadedly engaged with bracket 421, the distance between head 422*h* and bracket 421 can be varied by applying a torque to fastening member 422. The advantage with threaded coupling is that the relative distance between head 422*h* and bracket 421 can be varied with continuity and without jumps. Although a threaded coupling has been described above, it should be understood that fastening member 422 could be fixed to bracket 421 in any manner permitting adjustment of their reciprocal distance.

Elastic member 440 may comprise one or more than one elastic elements. According to the embodiment shown in FIG. 4, elastic member 440 comprises two elastic elements. According to other embodiments not shown in the figures, elastic member 440 may comprise only one elastic element or more than two elastic elements. Preferably, each elastic element of elastic member 440 is associated with one fastening member 422 of biasing mechanism 420. Thus, preferably, the number of elastic elements of elastic member 440 is equal to the number of fastening members 422 of biasing mechanism 420. Although in the following the discussion will be made in relation to one elastic member, it should be understood that the same discussion can also be applied, mutatis mutandis, to the other elastic members which could form elastic member 440.

Elastic member 440 has a characteristic rest length and spring constant. Furthermore, elastic member 440 has a characteristic minimum length beyond which it cannot be compressed. If elastic member 440 comprises more than one elastic element, each elastic element has its own spring constant, rest length and minimum length, which are known characteristic parameters of each elastic element.

Elastic member 440 exerts an elastic force whose magnitude is univocally determined by the amount of deflection of the elastic member 440 with respect to its rest length. Thus, the elastic force exerted by elastic member 440 is a well defined function of the deflection, thereby resulting in a "force versus deflection" characteristic not showing any hysteresis.

According to an embodiment, the amount of the elastic force is directly proportional to the difference between the length of the elastic member 440 and the rest length. The proportionality constant is the spring constant characteristic of elastic member 440. Thus, the magnitude of the elastic force exerted by elastic member 440 is linearly dependent on its amount of elongation or compression with respect to its rest length. According to other embodiments the magnitude of the elastic force might not be linear across the whole range of deflection of elastic member 440. For example, in embodiments elastic member 440 can comprise a spring with a non-linear force vs. deflection characteristic. Examples of such a class of springs include: progressive springs, degressive springs, constant force springs, and the like.

Advantageously, elastic member 440 comprises an elastic body whose spring constant is well determined and does not change over time. According to an embodiment, elastic member 440 can comprise at least one spring. According to particular embodiments, elastic member 440 can comprise a coil spring or a die spring.

Elastic member 440 is positioned between biasing mechanism 420 and upper structure 220 so as to abut onto a respective surface thereof. More specifically, elastic member 440 comprises an upper end portion 442 abutting onto an abutting surface of biasing mechanism 420 and a lower end portion 444 abutting onto an abutting surface of lower structure 220. The abutting surface of biasing mechanism 440 lies above the abutting surface of lower structure 220.

When clamping system 1000 is closed, elastic member 440 is positioned between upper structure 220 and lower structure 240 connected to biasing mechanism 420. Thus, upper structure 220 can be connected to lower structure 240 through elastic member 440.

The abutting surface of upper structure 220 can comprise a surface of a protruding element 228 formed on a surface of upper arm 220, as shown in FIG. 4. According to the embodiment shown in FIG. 4, protruding element 228 is formed in second end portion 220*b* of upper arm 220. On the other hand, the abutting surface of biasing mechanism 420 is preferably formed on head 422*h*. The length of elastic member 440 is thus equal, except for a constant, to the distance 432 between head 422*h* of fastening member 422 and protruding element 228 of upper arm 220. Conveniently, a portion of fastening member 422 can be housed in a through hole formed in protruding element 228, so as to prevent fastening member 422 from being laterally displaced from upper structure 220 under the effect of an external stress.

Preferably, elastic member 440 has a rest length which is considerably greater than the range within which the distance 432 can vary during ordinary operation of clamping system 1000.

Thus, elastic member 440 is usually compressed with respect to its rest length during operation of clamping system 1000. However, according to other embodiments, elastic member 440 can be elongated with respect to its rest length.

When compressed, elastic member 440 applies to upper structure 220 a force directed along the negative vertical direction and to biasing mechanism 420 a force directed along the positive vertical direction. The forces applied by elastic member 440 to upper structure 220 and to biasing mechanism 420 have equal magnitudes.

If elastic member 440 comprises more than one elastic element, the magnitude of the resulting elastic force applied by elastic member 440 to upper structure 220 and lower structure 240 can be obtained by summing up the magnitude of the elastic force applied by each single elastic element. The embodiment shown in FIGS. 3 and 4, wherein device 400 comprises two fastening members 422 and two associated elastic elements in symmetric positions, is advantageous since the elastic force can be symmetrically distributed in two different points of upper structure 220. Again due to reasons of symmetry, the two elastic elements may advantageously have the same rest length.

Due to the rigid structure of upper structure 220 and lower structure 240, the elastic force applied by elastic member 440 is transferred to the surface of blade 100, thus resulting in a clamping force. Since clamp 1000 operates as a second-class lever, the magnitude of the clamping force can readily be determined by multiplying the magnitude of the elastic force by an appropriate factor. This factor, typically ranging between 0 and 1, can be quantitatively determined depending on the structural characteristics of clamp 1000, as explained above.

By adjusting the distance of head 422h of fastening member 422 with respect to bracket 421, the amount of compression of elastic member 440 may be adjusted. In particular, when clamp 1000 is closed with a portion of blade 100 housed therein, reducing the distance between head 422h and bracket 421 results in a compression force applied onto elastic member 440. Elastic member 440 tends to expand by increasing distance 432. However, this action is contrasted by the reaction contact force applied by the blade surface to upper structure 220 and lower structure 240, which increases when distance 432 increases. Thus, a reduction of the distance between head 422h and bracket 421 results in a decrease of distance 432, i.e. a decrease of the length of elastic member 440. A reduced length of elastic member 440 causes in turn the magnitude of elastic force and of the clamping force to increase.

The magnitude of the elastic force can be univocally determined once the length of elastic member 440 is known, provided that the rest length and the spring constant of elastic member 440 are known in advance. Consequently, the magnitude of the clamping force is also univocally determined, once the current length of elastic member 440 has been measured.

This is a considerable advantage with respect to analogous devices known from the state of the art. The clamping force can always be reliably and univocally determined with a high degree of precision by simply measuring the length of elastic member 440, provided that the functional relation between the elastic force and the deflection is known in advance. Furthermore, the clamping force can be adjusted to a predetermined magnitude by using biasing mechanism 420 in order to deflect elastic member 440 until a length of elastic member 440 is achieved resulting in the desired magnitude of the elastic force.

Furthermore, the clamping force adjustment system hereby proposed is reliable over time. The clamping force determination method does not vary over time, as long as the spring constant and the rest length of elastic member 440 do not change over time.

The reliability of the proposed system and method for accurately adjusting the magnitude of the clamping force is enhanced due to the well defined response of elastic member 440 to an applied load, which can be for example a linear response. This one-to-one correspondence between deflection and elastic force is achieved by preventing frictional forces from mingling to the elastic force and contributing to the resulting clamping force. This result could not be obtained if Belleville spring washers were used in order to produce the clamping force.

In FIGS. 3 and 4, elastic member 440 of clamping force adjustment device 400 is shown to act upon one or two symmetric protruding elements 228 formed on the surface of second end portion 220b of upper structure 220. This has several advantages. Since clamping system 1000 operates as a second-class lever when closed, it is convenient to have as large as possible an effort arm, i.e. as large a distance as possible between the application point of the effort and the lever fulcrum. Since the fulcrum coincides with connection point 260, the furthest point is at second end portion 220b of upper structure 220. Furthermore, the distance between an end portion of upper structure 220 and lower structure 240 is in general shorter than the distance of other non-end portions of upper structure 220 from lower structure 240. Thus, it is convenient to apply device 400 to an end portion of upper structure 220, so that the length of fastening member 422 can be reduced.

However, clamping force adjustment device 400 does not necessarily have to act upon second end portion 220b. For example, device 400 could also be applied to a point of upper arm 222, if necessary.

In the following, typical operation procedures of clamping system 1000 will be discussed.

In the initial stage of operation, clamping system 1000 is opened in order to enable insertion of a blade 100 into the system.

Opening is accomplished by disconnecting at least one of first end portion 220a and second end portion 220b of upper structure 220 from lower structure 240. In the embodiment shown in FIGS. 3 and 4, second end portion 220b can be disconnected by detaching device 400 from second strut 280b. This can be achieved, for example, by unfastening fastening mechanism 600. Alternatively, second end portion 220b can be disconnected by unfastening fastening elements 422 of device 400 from bracket 421.

After second end portion 220b has been disconnected, it can be moved away from lower structure 240. This can be obtained by causing a rotation of upper structure 220 about pivot 260. Rotation continues until a sufficient gap is formed between upper contact element 226 and lower contact element 246 for inserting a blade 100 between them. Alternatively, first end portion 220b of upper structure 220 can also be disconnected from lower structure 240, for example by removing hinge 260. This completely demounts upper structure 220 from lower structure 240, so that the gap between upper contact element 226 and lower contact element 246 can be increased up to a desired value.

After opening clamping system 1000, a blade 100 is introduced therein. For example, a lower surface 104 can be laid onto lower holding profile 246 so as to abut thereon. Subsequently, upper structure 220 can be moved closer to lower structure 240, until the abutting surface 226as of upper contact element 226 abuts onto upper surface 102 of blade 100, opposite lower surface 104 thereof. Thereafter, first end portion 220a and second end portion 220b of upper structure 220 are connected to lower structure 240. In the embodiment shown in FIGS. 3 and 4, first end portion 220a is already connected through hinge 260 to lower structure 240, whereas second end portion 220b is connected to lower structure 240 by locking clamping force adjustment device 400 to second strut 280b. This can be achieved by locking fastening mechanism 600. When clamping system 1000 is closed, fastening members 422 are attached to bracket 421.

It should be noticed that, since second end portion 220b of upper structure 220 is connected to lower structure 240 through elastic member 440, the distance 434 between second end portion 220b and bracket 421 may vary depending on the size of blade 100 inserted into clamp 1000. Thus, after closing clamping system 1000 is closed, the initial amount of deflection of elastic member 440 may be such that the gap between upper contact element 226 and lower contact element 246 fits the blade dimensions.

After closing clamping system 1000, the magnitude of the clamping force applied to blade 100 may be adjusted by using device 400. More specifically, the position of fastening member 422 may be adjusted with respect to bracket 421 so that elastic member 440 is deflected up to a predetermined degree, thus exerting a force with a predetermined magnitude. The deflection of elastic member 440 may be varied by varying the distance of head 422h with respect to bracket 421, respectively. It is observed that this distance which may be alternatively increased or decreased is the sum of distances 432 and 434.

According to an embodiment, soon after closing clamp 1000, elastic member 440 is weakly compressed, thus resulting in a relatively low magnitude of the clamping force. The compression of elastic member 440 is then gradually increased by moving head 422h of fastening member 440 closer to bracket 421, so as to reduce length 432. For example, if fastening member 422 is threadedly engaged with bracket 421 as in the embodiment shown in FIG. 4, a torque can be applied to fastening member 422. Increasing the amount of compression of elastic member 440 results in an increased elastic force and, consequently, in an increased clamping force.

Subsequently, the clamping force magnitude can be increased up to a predetermined level. This is accomplished by gradually moving head 422h of fastening member 422 closer to bracket 421. For example, if fastening member 422 is threadedly engaged with bracket 421 as in the embodiment shown in FIG. 4, the clamping force magnitude can be increased by applying to fastening member 422 a torque such as to cause head 422h to move downwards. As head 422h moves downwards, the amount of compression of elastic member 440 gradually increases. The increased compression of elastic member 440 then causes the magnitude of the clamping force experienced by blade 100 to increase.

Elastic member 440 can be compressed until it reaches such a length as to result in a predetermined elastic force. In particular, according to an embodiment, elastic member 440 is compressed between head 422h and protruding element 228 until it reaches its minimum length, i.e. the length for which elastic member 440 is maximally compressed. In this position, the magnitude of the elastic force exerted by elastic member 440 reaches a maximum, which can be determined if the characteristic parameters of elastic member 440 are known. The target clamping force magnitude can thus be easily reached, without the need for carrying out length measurements on elastic member 440.

When blade 100 has to be extracted from clamping system 1000, clamp 1000 has to be opened again, so as to increase the gap between upper contact element 226 and lower contact element 246. This can be for example achieved by unlocking clamping force adjustment device 400 from second strut 280b. For example, fastening device 600 could be unlocked for this purpose. Alternatively, fastening members 442 can be loosened or detached from bracket 421.

The clamping system 1000 can be advantageously applied for storing wind turbine blades after being produced. For example, a wind turbine blade could be stored in the production facilities before being transferred to the final location of operation. Clamping system 1000 may also be advantageously used for transporting a wind turbine blade, for example from the production site to the final installation site.

Figure 1:
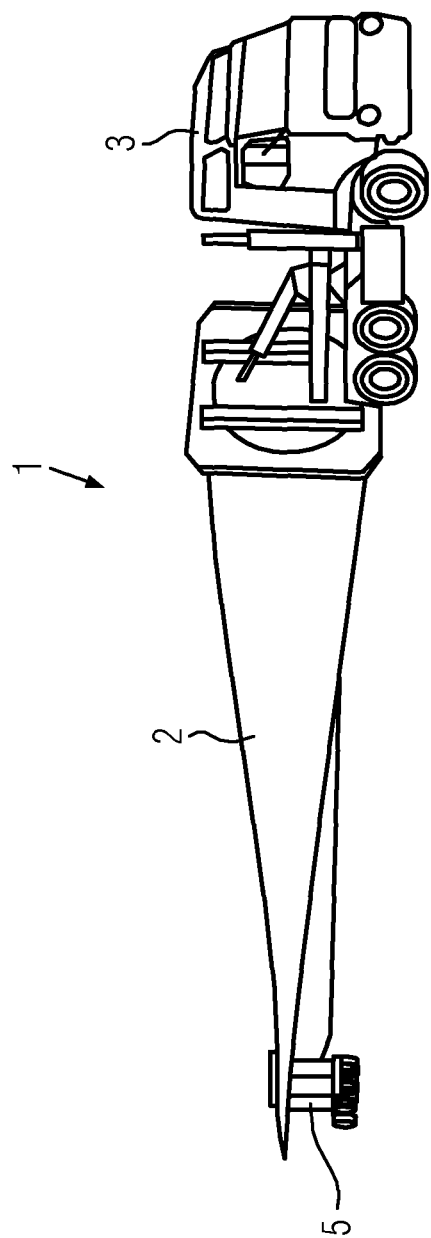
FIG. 1 shows a vehicle used for transporting a wind turbine blade according to the prior art.

According to an embodiment, the clamping system 1000 is mounted in a vehicle for transporting a wind turbine blade, such as vehicle 1 shown in FIG. 1. Vehicle 1 comprises a tractive unit 3 and a non-tractive unit 5. The tractive force is transferred from tractive unit 3 to non-tractive unit 5 through blade 2 mounted in vehicle 1. According to an embodiment, clamping system 1000 described above is a constituent part of non-tractive unit 5 shown in FIGS. 1 and 2. In particular, clamping system 1000 could advantageously replace the carrier arrangement 26 shown in FIG. 2.

Figure 2:
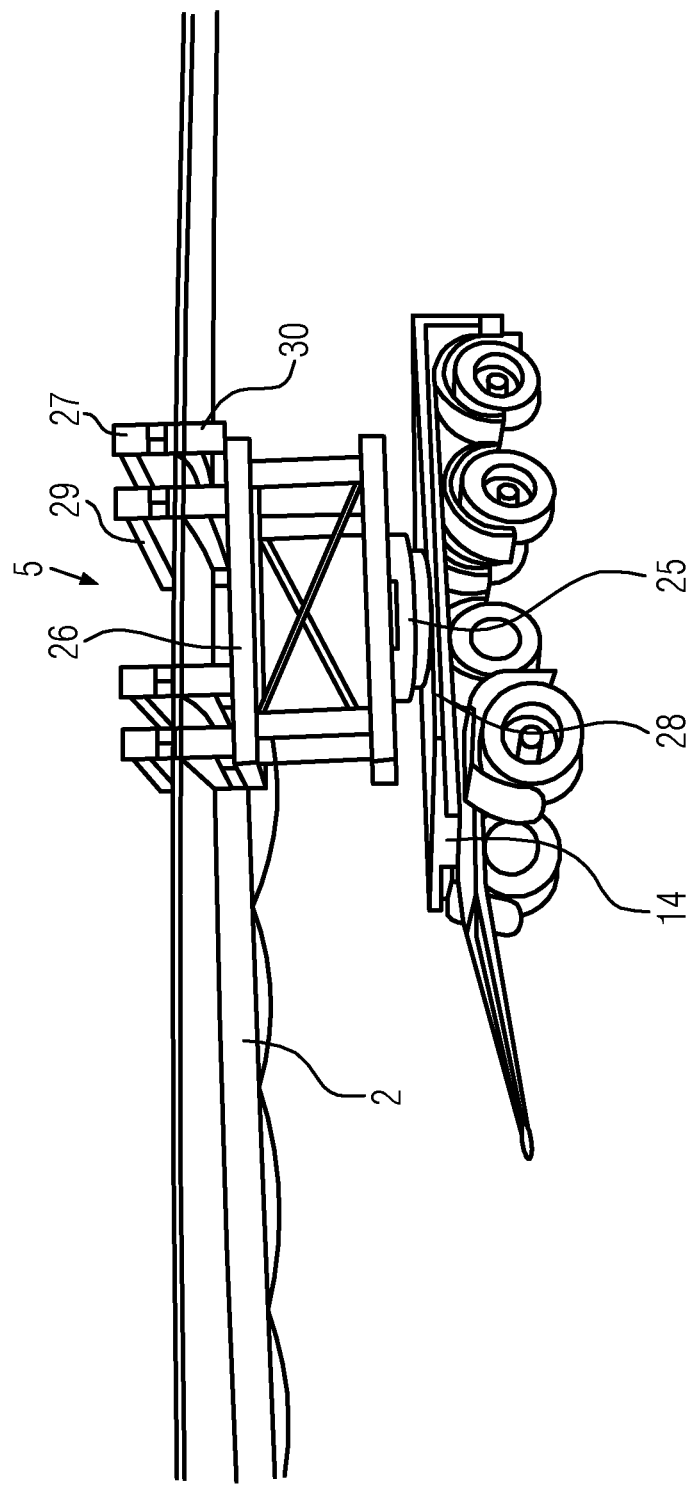
FIG. 2 shows an enlarged view of a non-tractive unit of a vehicle for transporting a wind turbine blade according to the prior art.

Thus, according to an embodiment, a non-tractive unit of a vehicle for transporting a wind turbine blade could comprise a platform 28 mounted on a chassis, as shown in FIG. 2. The chassis is preferably provided with wheels so that it can be moved. A rotatable part 25 is mounted on platform 28, again as shown in FIG. 2. The clamping system 1000 according to one of the embodiments described above is then mounted to rotatable part 25. In particular, according to an embodiment, lower structure 240 is mounted to rotatable part 25. According to an alternative embodiment, upper structure 220 is mounted on rotatable part 25. The non-tractive unit can be advantageously used in conjunction with a tractive unit in order to safely transport a wind turbine blade, in particular a blade of huge dimensions.

Although the present invention has been clarified above by means of a detailed description of its embodiments shown in the attached drawings, it is to be specified that the present invention is not limited to the shown and described embodiments. Rather, all those embodiments equivalent to those described and shown which will be apparent to the person skilled in the art belong to the present invention. The scope of protection of the present invention is thus defined by the claims.

The invention claimed is:

1. A clamping device for storing and transporting a wind turbine blade comprising:
   a first structure and a second structure adapted to abut onto opposite sides of the wind turbine blade, wherein said first structure comprises a first end portion adapted to be rotatably fixed to an end portion of said second structure and said first structure also comprises a second end portion opposite said first end portion, the position of said second end portion of said first structure with respect to said second structure being adjustable, and wherein in a closed position of the clamping device, both said first end portion and second end portion of said first structure are connected to said second structure;

a clamping force adjustment device permitting adjustment of the magnitude of a clamping force exerted by said first structure and said second structure onto the wind turbine blade;

an elastic member arranged between said first structure and said second structure so as to apply to said first structure and said second structure an elastic force with a magnitude having a predetermined and univocal dependency on the amount of deflection of said elastic member with respect to a characteristic rest length, the magnitude of said clamping force being proportional to the magnitude of said elastic force, wherein said elastic member is in spaced relation to the wind turbine blade; and a biasing mechanism adapted to deflect said elastic member, so as to permit adjustment of the magnitude of said elastic force.

2. The clamping device according to claim 1, wherein said elastic force is linearly dependent on the difference between a length of said elastic member and said characteristic rest length.

3. The clamping device according to claim 1, wherein said elastic member comprises a coil spring.

4. The clamping device according to claim 1, wherein said biasing mechanism is adapted to be fastened to one of said first structure or second structure, said elastic member being arranged between said biasing mechanism and either one of said first structure or said second structure not fastened to said biasing mechanism.

5. The clamping device according to claim 1, wherein said biasing mechanism comprises at least one fastening member having a head adapted to abut onto an end portion of said elastic member, the distance of said head from said second structure being adjustable in such a way that an amount of compression of said elastic member increases as the distance of said head from said second structure is reduced.

6. The clamping device according to claim 5, wherein said fastening member comprises a thread adapted to engage with a matching thread formed in a housing fixed to said second structure, so that a torque applied to said fastening member results in a variation of the distance between said head of said fastening member and said second structure.

7. The clamping device according to claim 1, wherein said first structure comprises an upper contact element adapted to abut onto an upper surface of the wind turbine blade and a lower contact element adapted to abut onto a lower surface of the wind turbine blade, said upper contact element and said lower contact element having a surface profile matching said upper surface and said lower surface of the wind turbine blade, respectively.

8. The clamping device according to claim 1 adapted to be operated as a second-class lever, whereby the magnitude of the clamping force is determined by multiplying the magnitude of the elastic force by an appropriate factor quantitatively determined by structural characteristics of the clamping device.

9. A vehicle for transporting a wind turbine blade comprising:
a tractive unit;
a non-tractive unit adapted to be connected to said tractive unit, said non-tractive unit comprising a clamping device according to claim 1.

10. A method of storing and/or transporting a wind turbine blade comprising:
inserting the wind turbine blade between a first structure and a second structure of a clamping device so that said first structure and said second structure abut onto opposite surfaces of the wind turbine blade, respectively, said first structure comprising a first end portion adapted to be rotatably fixed to an end portion of said second structure and said first structure also comprising a second end portion opposite said first end portion, the position of said second end portion of said first structure with respect to said second structure being adjustable;

using an elastic member arranged between said first structure and said second structure so as to apply to said first structure and said second structure an elastic force, the magnitude of said elastic force being proportional to the magnitude of a clamping force exerted by said clamping device on the wind turbine blade, wherein said elastic member is in spaced relation to the wind turbine blade;

adjusting the magnitude of said elastic force so that said clamping force has a predetermined magnitude, said adjustment of the magnitude of said elastic force comprising deflecting said elastic member by means of a biasing mechanism, wherein the magnitude of said elastic force has a predetermined and univocal dependency on the amount of deflection of said elastic member with respect to a characteristic rest length; and closing the clamping device in a closed position, wherein both said first end portion and said second end portion of said first structure are connected to said second structure.

11. The method according to claim 10, wherein said step of adjusting the magnitude of said elastic force comprises compressing said elastic member until it reaches a predetermined length.

12. The method according to claim 11, wherein said predetermined length is a minimum length characteristic of said elastic member.

13. The method according to claim 10, wherein said step of deflecting said elastic member comprises adjusting the distance between a fastening member of said biasing mechanism and said second structure, said fastening member abutting onto an upper end portion of said elastic member.

14. The method according to claim 13, wherein said fastening member is threadedly engaged with said second structure, and wherein said step of adjusting the distance between said fastening member and said second structure comprises applying a torque to said fastening member.

15. A clamping device for storing and transporting a wind turbine blade comprising:
a first structure and a second structure adapted to abut onto opposite sides of the wind turbine blade, wherein said first structure comprises a first end portion adapted to be rotatably fixed to an end portion of said second structure and said first structure also comprises a second end portion opposite said first end portion, the position of said second end portion of said first structure with respect to said second structure being adjustable, and wherein in a closed position of the clamping device, both said first end portion and second end portion of said first structure are connected to said second structure;

a clamping force adjustment device permitting adjustment of the magnitude of a clamping force exerted by said first structure and said second structure onto the wind turbine blade;

an elastic member arranged between said first structure and said second structure so as to apply to said first structure and said second structure an elastic force with a magnitude having a predetermined and univocal dependency on the amount of deflection of said elastic member with respect to a characteristic rest length, the magnitude of said clamping force being proportional to the magnitude of said elastic force, wherein the elastic member comprises a coil spring; and a biasing mechanism adapted to deflect said elastic member, so as to permit adjustment of the magnitude of said elastic force.

16. The clamping device according to claim 15, wherein said elastic force is linearly dependent on the difference between a length of said elastic member and said characteristic rest length.

17. The clamping device according to claim 15, wherein said biasing mechanism is adapted to be fastened to one of said first structure or second structure, said elastic member being arranged between said biasing mechanism and either one of said first structure or said second structure not fastened to said biasing mechanism.

18. The clamping device according to claim 15, wherein said biasing mechanism comprises at least one fastening member having a head adapted to abut onto an end portion of said elastic member, the distance of said head from said second structure being adjustable in such a way that an amount of compression of said elastic member increases as the distance of said head from said second structure is reduced.

* * * * *